No. 687,331. Patented Nov. 26, 1901.
R. McKAY & F. R. WELTON.
BUTTON SETTING MACHINE.
(Application filed Dec. 18, 1899.)

(No Model.) 5 Sheets—Sheet 1.

WITNESSES.
O. B. Barnziger
M. Hickey.

INVENTORS
Robert McKay
Frank R. Welton
By Muvell S. Wright
their Attorney

No. 687,331.

Patented Nov. 26, 1901.

R. McKAY & F. R. WELTON.
BUTTON SETTING MACHINE.
(Application filed Dec. 18, 1899.)

(No Model.)

WITNESSES.

INVENTORS.
Robert McKay
Frank R. Welton
By Newell S. Wright
their Attorney.

No. 687,331. Patented Nov. 26, 1901.
R. McKAY & F. R. WELTON.
BUTTON SETTING MACHINE.
(Application filed Dec. 18, 1899.)

(No Model.) 5 Sheets—Sheet 3.

No. 687,331. Patented Nov. 26, 1901.
R. McKAY & F. R. WELTON.
BUTTON SETTING MACHINE.
(Application filed Dec. 18, 1899.)

(No Model.) 5 Sheets—Sheet 5.

WITNESSES.
O. B. Banziger.
M. Hickey.

INVENTORS
Robert McKay
Frank R. Welton
By Newell S. Wright
Their Attorney.

THE NORRIS PETERS CO., PHOTO-LITHO., WASHINGTON, D. C.

UNITED STATES PATENT OFFICE.

ROBERT McKAY AND FRANK R. WELTON, OF DETROIT, MICHIGAN, ASSIGNORS TO THE McKENNEY BUTTON FASTENING COMPANY, OF DETROIT, MICHIGAN, A CORPORATION OF MICHIGAN.

BUTTON-SETTING MACHINE.

SPECIFICATION forming part of Letters Patent No. 687,331, dated November 26, 1901.

Application filed December 18, 1899. Serial No. 740,721. (No model.)

*To all whom it may concern:*

Be it known that we, ROBERT McKAY and FRANK R. WELTON, citizens of the United States, residing at Detroit, county of Wayne, State of Michigan, have invented certain new and useful Improvements in Button-Setting Machines; and we declare the following to be a full, clear, and exact description of the invention, such as will enable others skilled in the art to which it appertains to make and use the same, reference being had to the accompanying drawings, which form a part of this specification.

Our invention has for its object a novel button and staple setting machine; and it consists of the construction, combination, and arrangement of devices hereinafter described and claimed, and illustrated in the accompanying drawings, in which—

Fig. 9 is a vertical longitudinal section through the die-spindle. Fig. 19 is a view in side elevation, showing details of the button-holding and fastener-holding devices. Fig. 21 is a front elevation similar to Fig. 20, but showing the fastener-holding blades in a state of partial depression. Fig. 27 is a view looking at Fig. 5 from the left.

More particularly, our invention pertains to a button-setting machine more especially designed and adapted for setting shoe-buttons and wherein a two-pronged staple is employed to set the buttons upon the shoes. While, however, the drawings submitted herewith show the machine specifically adapted for this purpose, we would have it definitely understood that we do not limit ourselves to a machine to set shoe-buttons only, but contemplate as coming within the scope of our invention any and all uses to which the machine may be applied, inasmuch as the chief features of the machine may be employed in setting other styles of buttons upon various kinds of work. So, also, the chief features of the machine may be employed in setting a two-pronged fastening upon work where buttons are not employed. Our invention therefore contemplates, broadly, a machine for setting a two-pronged fastening upon the work with or without the employment of buttons in connection therewith.

The purpose of our invention is to provide a machine of this class of superior efficiency, simplicity, and utility.

Any suitable supporting-frame is indicated at *a*. A driving-shaft is indicated at *b*, suitably journaled in said frame and upon which is mounted a driving cam-wheel c, provided on one side thereof with a cam-groove d to actuate the setting-die and certain features of the button-feeding mechanism and on the other side thereof with a cam-groove e to actuate certain features of the fastener-feeding mechanism. The cam-wheel c, as will be seen, is in the nature of a double cam. The shaft b is provided with a driving-wheel f, driven from any suitable source of power. An additional shaft g is also journaled in the supporting-frame, driven by a belt h from the shaft b or otherwise, as may be desired.

Supported upon the frame a is a button-hopper i and a fastener-hopper j, through which a shaft o passes, said shaft being provided with a button-feed wheel k and a fastener-feed wheel l, rotatable with the shaft o within their respective hoppers.

A button-runway is indicated at m and a fastener-runway at n. These runways may be of any desired construction. The fastener-feed wheel is constructed with plural arms p, three being preferably employed, although we do not limit ourselves to any particular number of said arms. These arms are constructed to engage the prongs of a fastener astride thereof and to deliver the fasteners freely from the outer ends thereof in their rotation to the fastener-runway. To this end said arms are preferably made straight on the side opposite the direction of rotation and curved on the forward edge, as shown, the curved edge of one arm being joined to or leading to the straight edge of the adjacent arm, so that the fasteners may be gathered by the curved edge of one arm and permitted to ride therefrom onto the straight edge of the adjacent arm. The button-feed wheel is similarly constructed, except that the wheel is made double or of two parts or parallel wheels k k, each provided with plural arms q. For feeding shoe-buttons the two parts of the feed-wheel are located sufficiently apart the one from the other to admit the eye of the shoe-button therebetween, the head of the button resting upon the adjacent edges of the two portions of the wheel. This construction is more particularly shown in Fig. 2. This button-feed wheel is adapted, however, to feed other kinds of buttons also, and we would have it understood that we contemplate this construction of a button-feeding wheel as coming within our invention for feeding any and all kinds of buttons to which it may be found adapted. For feeding other styles of buttons—as pants-buttons, for example—the two parts k k of the button-feeding wheel need only be spaced farther apart the one from the other without changing whatever the principle of construction.

Each of the arms of the button-feeding wheel is shown provided with a finger r, attached thereto and constructed to overhang the edge of the corresponding arm and prevent the passage to the runway of buttons not in proper position to be delivered to the runway. This we accomplish by constructing the overhanging portion of the finger with a bevel edge, as shown. By this construction should a button lodge upon the arm of the feed-wheel wrong side up it will be readily knocked off as it strikes the bevel edge of the finger. This construction of the button-feeding wheel is simple, efficient, not liable to clog, and is adapted to feed the buttons with great facility. To prevent the clogging of the runways by too rapid a delivery of the fasteners or buttons thereto, we provide adjacent to the upper end of each runway a kicker-arm or removing device to knock off the fasteners or buttons which may unduly accumulate at the upper ends of the runways, so that both the fastening and the button feed wheels may be permitted to have a continuous intermittent rotation or feeding movement. To this end a kicker-arm in the form of an oscillatory bell-crank is located adjacent to the upper end of the fastener-runway, and a similar arm t is located adjacent to the upper end of the button-runway. A spring u adjacent to each arm exerts its tension thereupon.

To actuate the kicker-arms, the shaft o is provided with cams v and w, the cam v being located adjacent to the arm s and the cam w adjacent to the arm t. These cams or cam-wheels are constructed with suitable cam-shaped surfaces to strike the adjacent end of the corresponding kicker-arm and give thereto an oscillating movement. These kicker-arms may be of bell-crank shape pivoted intermediate their ends to an adjacent portion of a corresponding hopper. The arm t may be preferably provided with a brush 45 to contact with the buttons to throw the buttons off the runway and back into the hopper. We do not limit the construction of the kicker-arms to any specific shape or material. These clearing devices or kicker-arms keep the corresponding runways from clogging.

The machine is provided with a die-spindle x, preferably made tubular at its upper end, the spindle being made reciprocatory within a case y and provided with a setting-die z at its lower end. To actuate the spindle, the machine is provided with a lever (indicated by the numeral 1) fulcrumed intermediate its ends, as shown at 2, the inner end thereof being provided with a cam-roll 3, engaged in the cam-groove d of the double cam-wheel c. The forward end of the lever is engaged with the die-spindle, which is shown provided with an elongated orifice 4 to permit the passage of the adjacent end of the lever therethrough. The case y is also provided with a similar orifice 5, through which the adjacent end of the lever 1 projects. To permit a desired amount of free movement of the forward end of the lever, the orifices 4 and 5 are vertically elongated, the forward end of the lever being formed with a guide-pin 6, reciprocatory in the tubular portion of the spindle. The die-spindle is provided with a spring-arm 7, secured thereto, to engage the head of a button and hold its eye in place against the setting-die to receive the prongs of a fastening. The die is preferably cut away or recessed on one of its lateral faces adjacent to the button-holding arm or device, as shown at 8, the recess permitting the tilting of the head of the button thereinto. This construction of the die enables the button-head to tilt into the recess to give more room for the leather or stock, if required. The button is permitted, it will be observed, to tilt or rock upon the shank of its attaching-eye as a fulcrum to give room for the work; otherwise were the stock of sufficient thickness it would be liable to be damaged. Where the stock is of unequal thickness, such a provision as this becomes necessary in order that it shall not be damaged.

At the base of the button-runway is a heel 9, provided with a slide 10. Pivoted to the runway is a bell-crank 11, having its lower end engaged with said slide to reciprocate the slide as the bell-crank is actuated. The buttons at the base of the runway drop in front of the slide when the slide is in retracted position, and the forward movement of the slide forces the lower button out of the base of the runway into the button-holding device or arm 7. In the advance movement of the slide the buttons above the lower end are supported upon the slide while the lower button is being discharged. As the slide recedes the buttons drop down in front of it.

Figures 7, 8, 10, 11, 12:
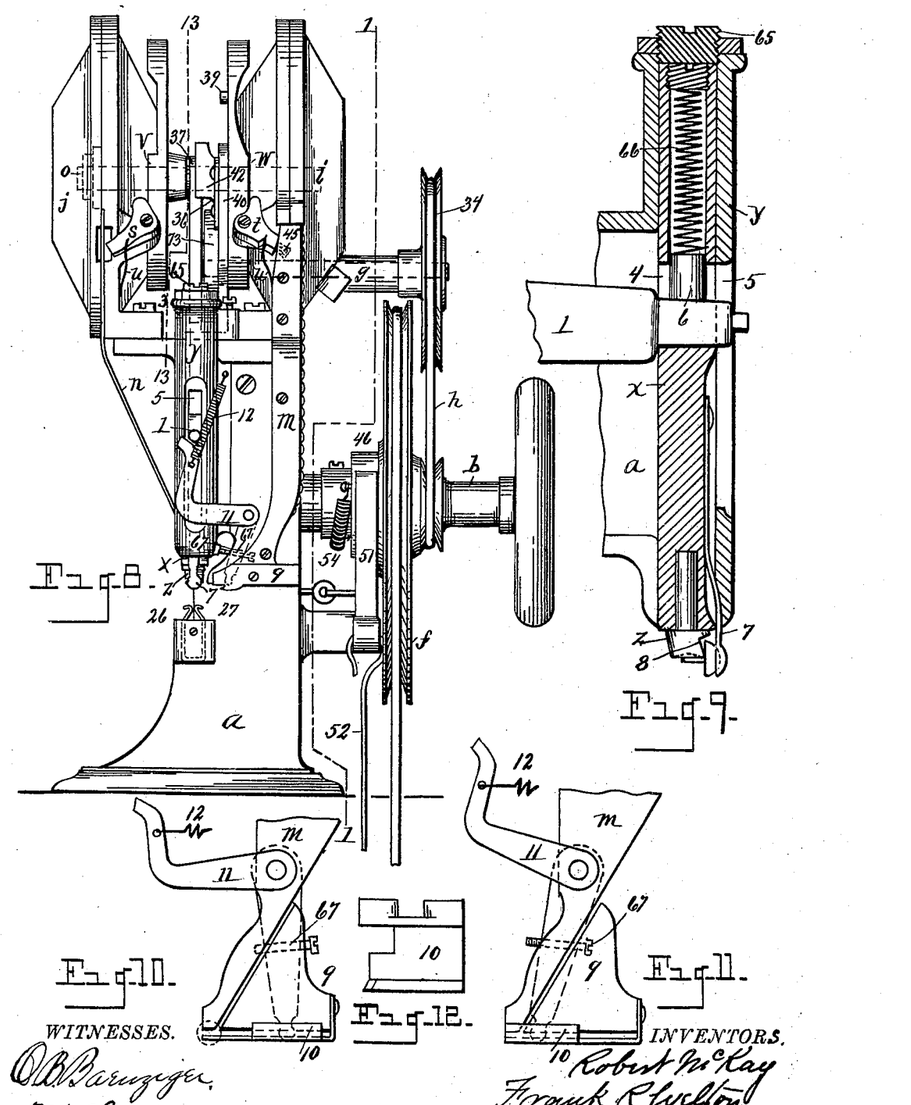
Fig. 8 is a front elevation of the machine.
Fig. 10 is a detail view of certain portions of the apparatus for feeding the buttons, the parts being in the position occupied before the button is fed into the button-holding mechanism.
Fig. 11 is a view of the same, but showing the parts in position occupied after the delivery of a button to the button-holding mechanism.
Fig. 12 is a view of the button-feeding slide.

The bell-crank 11 is actuated by the lever 1 and by a spring 12. As above observed, the lever 1 has a free movement in the elongated orifices 4 and 5. The spring 12 will hold the upper end of the bell-crank 11 up against the forward end of the lever, as shown in Fig. 8. The tension of the spring actuating the bell-crank feeds the button into position in the button-holding device. As the lever 1 rises the spring pulls the upper end of the bell-crank 11 higher to feed the button in the holding device. The descent of the lever 1 contacting with the bell-crank 11 will actuate said bell-crank, and thereby cause the slide to recede. It will be evident that in the ascent of the die-spindle the die will be caused to stop in the right position to receive the button by means of the spindle contacting with an adjusting-screw 65 in the top of the case $y$. The lever 1, however, is permitted to continue to move upward to the limit of its stroke, the opening 4 5 and the guide-pin 6 permitting the further movement of the lever, the spring also holding the spindle up against the adjusting-screw. The spring 12 pulls the bell-crank lever 11 up against the lever 1, and as the die rises the button is fed into the holder. The bell-crank 11 has a stop-screw 67, arranged to contact with an adjacent portion of the frame and limit the stroke of said lever, so as to locate the button in the button-holder in proper position, said screw 67 preventing the bell-crank being moved to an undue degree in the forward motion of the slide 10.

Figure 1:
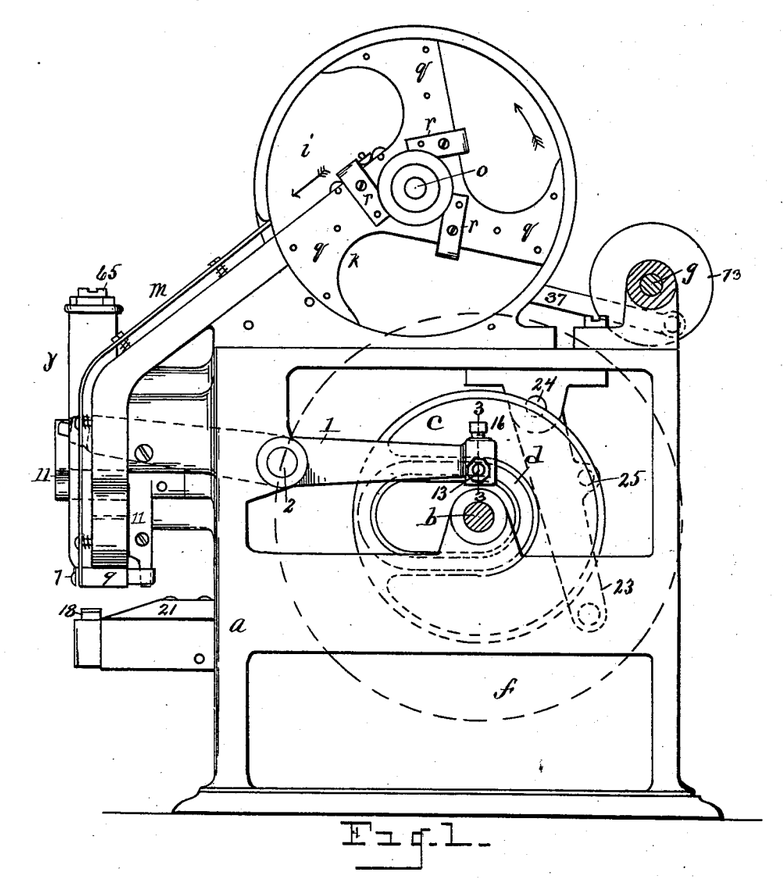
Figure 1 is a view of the machine in side elevation, showing the button-hopper, the cover of said hopper being removed.
Figures 2, 3:
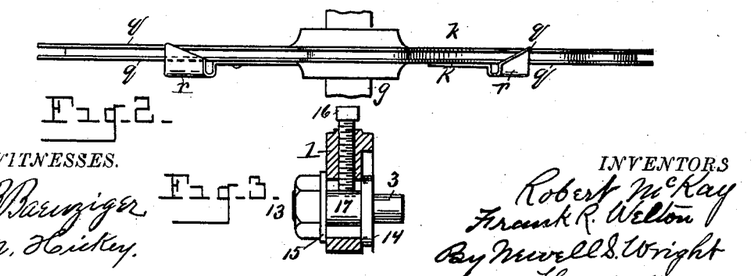
Fig. 2 is a detail view of the button-feeder.
Fig. 3 is a view in section on the line 3 3, Fig. 1.

To adjust the stroke of the lever 1, the pin 13, carrying the cam-roll 3, is adjustably clamped, by means of washers 14 and 15, to the slotted end of the lever 1, as shown in Fig. 3. By means of a set-screw 16, bearing upon a sleeve 17 upon said pin, the adjustment of the adjacent end of the lever 1 with relation to the cam-roll 3 is made secure. The machine is further provided with a die-seat 18 and with a plunger or reciprocatory slide 19 to force the fasteners upon the die-seat. A two-pronged fastening is indicated at 20. The forward end of the plunger is preferably constructed so as to engage against the head and against one of the prongs of a fastening so as not to tilt the fastener in the act of forcing it into proper position. The supporting-frame is provided with a fastener-guideway leading to the seat for the fastening, toward the forward end of which is a covered way, (indicated at the numeral 21,) through which the fasteners may be delivered to the die-seat, and also with suitable guides 22 to guide the reciprocation of the plunger 19. The plunger 19 is actuated by a lever 23, fulcrumed, as at 24, said lever provided with a cam-roll, (indicated at 25), engaged in the cam-groove $e$ of the double cam-wheel $c$. The die-seat is provided with fastener-holding blades or arms, (indicated at 26 and 27,) having a reciprocatory engagement adjacent to the die-seat and constructed to engage the prongs of a fastening and to hold the fastening in position upon the die-seat, the blades being made expansible, so that when the die descends against the prongs of the fastener said blades may expand to release the fastener and be depressed away from the prongs to permit the descent of the die. The upper end of the die-seat is beveled to spread the blades as the die contacts with the upper ends thereof. A spring 28 restores the blades to normal elevated position.

Figures 4, 5, 6, 7, 26:
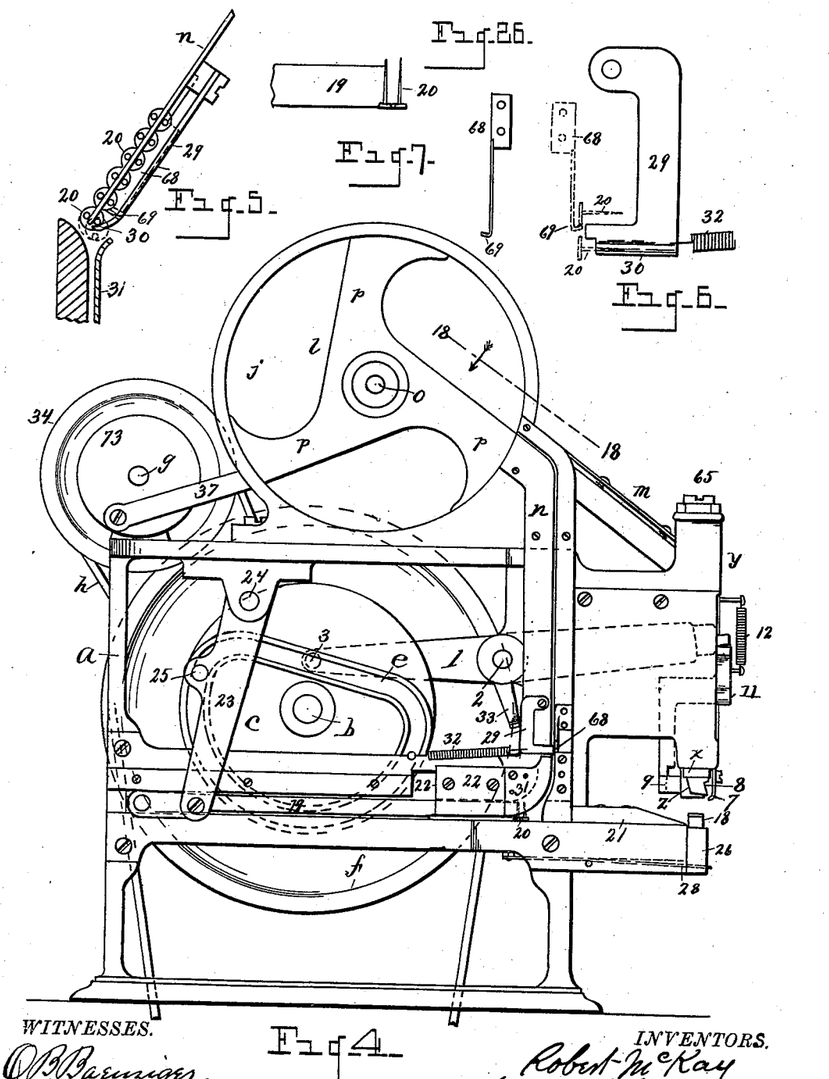
Fig. 4 is a view of the machine in side elevation from the other side of the machine, showing the fastener-hopper, the cover thereof being removed.
Fig. 5 is a detail view showing the method of dropping the fasteners.
Fig. 6 is a detail view of the fastener-dropper.
Fig. 7 is a detail view showing one end of the plunger by which the fasteners are forced upon the die-seat.
Fig. 26 is a detail view of the spring 68.

It will be obvious that as the fasteners are delivered from the fastener-hopper with the points projecting downward the position of the fastener must be reversed, and in order to bring the prongs into proper position for setting they must also be given a partial turn—as a quarter-turn, for example. To accomplish this, the fastener-runway is provided toward its lower end with a fastener dropper-blade 29, (shown in detail in Fig. 6,) constructed with a ledge 30 at its lower end, upon which one prong of the fastener may engage as the opposite prong rides off the lower end of the runway $n$. During the instant that the one prong is engaged upon the ledge 30 after the opposite prong is freed from the runway the weight of the fastener will effect a partial axial turn of the fastener before the corresponding prong is dislodged from said ledge, the prong resting on said ledge serving as an axis upon which the fastener turns or swings downward before the fastener is discharged from the runway and its dropper-blade 29. From the ledge the fasteners drop one by one into a reversing-runway, (indicated at 31,) preferably of curved form, and whereby the fasteners are discharged in front of the plunger 19 with their prongs projecting upward. The blade 29 is given an oscillatory motion to drop the fasteners by means of a spring 32 and a finger 33 upon the lever 1. As the lever 1 is forced downward the finger 33 will recede from the blade 29, the spring 32 then exerting its tension to force the blade in the corresponding direction. The opposite movement of the lever 1 will force the blade 29 in the opposite direction. To support the fasteners which are above the one resting upon the blade 29, we provide a spring 68, provided with a finger 69, arranged to project underneath the fasteners above the one resting upon said dropper-blade to support the fastenings resting upon said finger. This spring exerts its tension in a direction toward said dropper-blade and is forced in the opposite direction by said dropper-blade. When the dropper-blade 29 starts backward, it releases the spring 68, which engages the last but one of the column of fasteners, and thereby supports the columns of fasteners in place while the dropper-blade moves back sufficiently to allow the last fastener supported thereupon to drop, as already described. On the forward movement of the dropper-blade it strikes the spring and forces it back, thereby releasing the column of fasteners, the fasteners dropping down onto the projecting ledge of the dropper-blade, allowing the last fastener to swing partially around on one leg, giving it a quarter-turn and leaving it in position to drop down in front of the plunger 19 at the next backward movement of the dropper-blade.

We do not limit ourselves solely to the particular means herein shown and described for giving the fasteners a quarter-turn as they are separated one by one from the column of fasteners and dropped downward in front of the plunger 19.

Figures 13, 14, 15, 16, 17, 18:
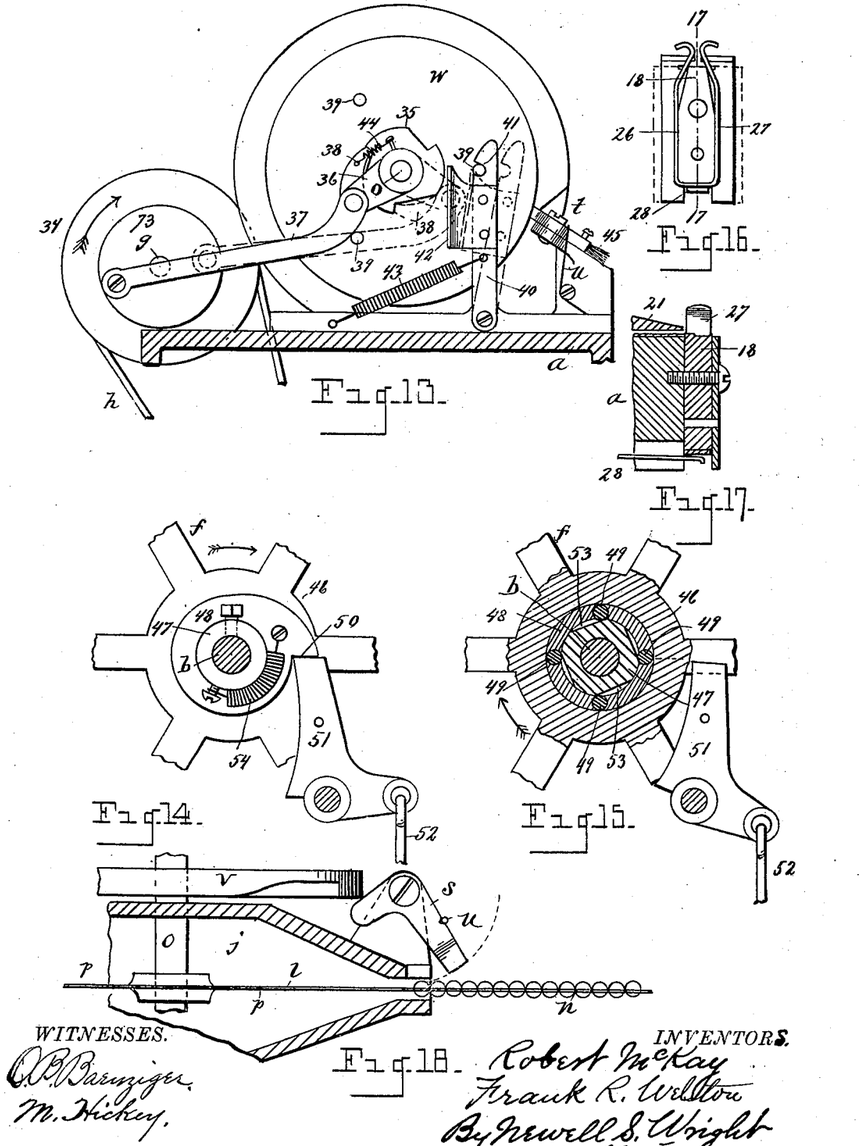
Fig. 13 is a view in section on the line 13 13, Fig. 8.
Fig. 14 is a side elevation of the clutch.
Fig. 15 is a vertical section through the clutch.
Fig. 16 is a front elevation showing the fastener-holding device.
Fig. 17 is a view in section on the line 17 17, Fig. 16.
Fig. 18 is a detail view showing the kicker-arm for freeing the fastener-runway from the undue accumulation of fasteners.
Figure 17:
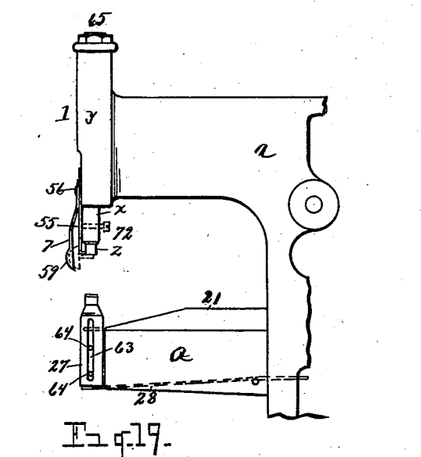

The shaft $o$ is given an intermittent motion, which we effect by means of a pulley 34 upon the shaft $g$. Upon the shaft $o$ is a ratchet 35, provided with a crank-arm 36, with which is connected a pitman-rod 37, eccentrically connected with a disk 73 upon the shaft $g$, as shown in Fig. 13, this construction and arrangement giving an oscillatory movement to the crank-arm 36. With the pitman-rod 37 is connected a pawl 38 to engage the ratchet-wheel 35 to operate the same. By reference to Fig. 13 it will be observed that when the rod 37 is projected into the position shown in dotted lines the pawl 38 will be in position to drive the ratchet-wheel on the opposite movement of the rod or into the position shown in full lines. The adjacent cam-wheel, as the wheel $w$, is provided with a series of pins or shoulders 39 and an oscillatory locking-arm is indicated at 40 constructed with a recess 41 at its upper end to engage the pins 39 and lock the cam-wheel. The arm 40 is provided with a shoulder 42, against which the crank-arm 36 may contact to force the arm 40 out of engagement with the pin and to permit the rotation of the cam-wheel. A spring 43 retracts the arm 40, and a spring 44 holds the pawl 38 in normal engagement with the ratchet-wheel. The two cams $v\ w$ being located upon the shaft $o$, together with the fastener-feeder and the button-feeder, said parts will be actuated simultaneously with an intermittent motion in the manner above described. Any number of pins 39 and ratchet-teeth upon the ratchet-wheel 35 may be employed to give as many intermittent movements to the cams and feeders as may be desired.

To control the operation of the shaft $b$ as by a foot-treadle, said shaft may be provided with any suitable clutch mechanism. The clutch mechanism preferably employed herewith is more particularly shown in Figs. 14 and 15, wherein the hub 46 of the driving-wheel $f$ is provided with an inner collar 47, located upon the shaft $b$. Between said collar and the hub is located an additional collar 48, recessed at intervals to receive a series of balls 49.

The collar 48 is constructed with a shoulder or stop 50, engaged by a bell-crank 51, the opposite end of the bell-crank being connected, as by a suitable connection 52, with a treadle. (Not shown.) The locking-lever 51 is engageable with said shoulder, and the collar 47 is cut away at desired points, as indicated at 53. When the locking-lever 51 is engaged with the shoulder 50 to lock the collar, the balls 49 are gripped between the collar 47 and the hub 46, so as to cause a rotation of the hub; but when the locking-lever 51 is disengaged from the shoulder of the collar 48 the hub 46 will be free to move without driving the shaft $b$, inasmuch as the balls are no longer gripped between the collar 47 and the hub, owing to the cutting away of the collar at the points 53 giving room for the balls. A spring 54, engaged at one end with the collar 47 and at the other with the collar 48, tends to hold the two collars in proper relation to the balls 49.

It will be observed that the prongs enter the work from underneath and from the side opposite that on which the button is placed, the setting-die being brought downward against the ends of the upwardly-projecting prongs above the buttons. This enables the buttons to be set on top of the work or upon the face side of the goods, the prongs of the fastener entering first through the work, then through the button, and then clenched.

Figures 20, 22, 23, 24:
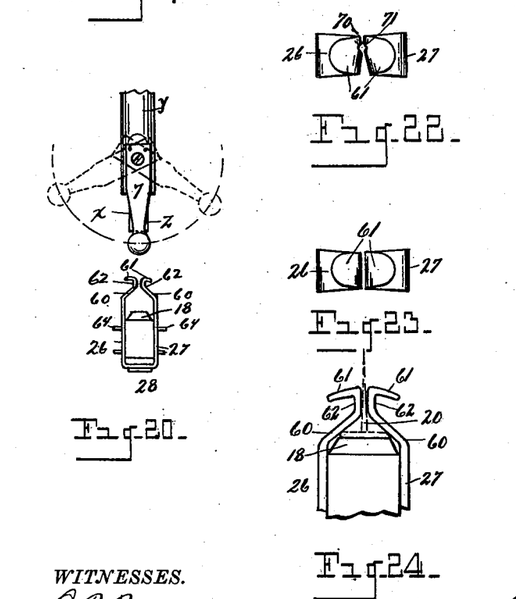
Fig. 20 is a front elevation of portions of the device, showing said features, the fastener-holding blades being in raised position.
Fig. 22 is a plan view of the fastener-holding blades, showing one form of construction.
Fig. 23 is a similar view showing a modification in the construction of the fastener-holding blades.
Fig. 24 is a view in detail showing the die and the fastener-holding blades in a partially-depressed position.
Figures 25, 26:
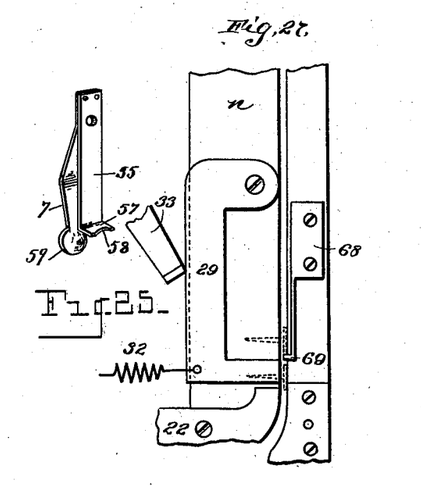
Fig. 25 is a detail view showing the button-holding arms.

In addition to the button-holding arm 7 we prefer to employ in some cases an additional spring-arm 55, (shown more particularly in Figs. 19 and 25,) the two arms 7 and 55 being preferably pivoted to the spindle, as indicated at 56, the lower end of said arm being constructed with an inwardly-projecting flange 57, forming a seat for the eye of a button, as a shoe-button, for example, the flange being concaved or recessed on its marginal edge, as indicated at 58, to permit the eye of a button setting up against the adjacent die $z$. The spring-arm 7 is constructed with a recessed or concaved lower end, as indicated at 59, adapted to fit over a button-head and to hold it in place in proper relation to the die for the prongs of a fastening to be turned and convoluted thereover to engage the prongs of a fastener therewith. We do not limit ourselves, however, to the employment of an inner spring-arm 55. The orifice 5 in the case $y$ may extend entirely through the lower end of said case or stop short of the lower end thereof, as may be preferred.

Where it is desired to set other forms of buttons or to set fastenings without buttons, the arms 7 and 55 may be swung out of the way, as indicated more particularly in Figs. 20 and 21.

Inasmuch as our invention is designed more particularly for setting a two-pronged fastening, it is obviously important that proper means should be provided to always hold the prongs in exactly the right position relative to the setting-die. To positively insure the two prongs of a fastening always being engaged and held in proper position upon the setting-die or therebeneath, our invention contemplates providing the fastener-holding blades 26 and 27, above described, the same being preferably formed of a single integral piece of metal and shaped to embrace opposite faces of the die-seat, the portion intermediate the ends of the blades passing underneath the end of the support for the die-seat, as shown, the fastener-holding blades having a sliding engagement upon the lateral faces of the die-seat and its support. The upper ends of the blades above the die-seat are bent inward the one toward the other, as shown, a little below the upper extremities of said blades, as at 60, the upper extremities of said blades being flanged outwardly or in opposite directions, as indicated at 61. The blades thus closely approach each other just below the flanged extremities, forming fastener-holding necks, (indicated at 62.) As shown in Fig. 22, the necks of the blades are normally separated a little distance the one from the other sufficient to admit the prongs of a fastening therebetween. At the rear edges the necks of the blades in the form shown in Fig. 22 are brought closely adjacent one to the other, as indicated at 70, the inner faces of the necks of the blades, toward the rear edges thereof in this form of construction, being slightly grooved vertically, as indicated at 71, the edges of the necks contacting at the rear of said grooves, the contacting edges forming an effectual stop to limit the insertion of a fastening into the blades. The blades are preferably bent inward at a point sufficiently above the upper edge of the die-seat, the blades being in normal position to permit the blades being moved a limited distance downward before the inwardly-bent portions thereof will contact with the setting-die. This movement will allow the extremities of the prongs to project a little distance beyond the laterally-turned flanges of the blades, so that the extremities of the fastening may be forced slightly into the work and sufficiently to hold the prongs in the work. The outer face of the die-seat being beveled, contact with the inwardly-turned beveled faces of the blades will thereby force said blades apart when pressure is applied upon the upper ends of said blades. It will be perceived that when the setting-die is forced downward contact will be formed with the upper surfaces of the flanges, and thereby the blades will be forced downward and apart.

To hold the blades in place and to provide for their reciprocation, they are each constructed with an elongated slot 63, and the adjacent face of the supporting-arm is provided with one or more pins 64, projecting laterally through the corresponding slot. We do not limit ourselves, however, to the construction of the blades with grooves 71, nor to having their rear edges contacting, as at 70. In the form shown more particularly in Fig. 23 the grooves are omitted and the rear edges of the blades do not contact. The blades are bent inward below the necks in such a manner as to contact with the head of the fastening in order that when the blades are depressed so that their necks are released from the prongs of the fastening their engagement with the head of the fastening will hold it firmly in place while the prongs are being clenched.

For different sizes of shoe-buttons the arm 55 may be set inward or outward, as required, by means of a set-screw 72 in the die-spindle.

It will be observed that the spring-arm secured to the die-spindle and made reciprocatory therewith (shown in Fig. 9) is constructed to engage the head of a button and to hold the button in position to receive the prongs of a fastening, the lower end of said spring-arm impinging against the case in the upward movement of the spindle to force the arm upon the button.

It will be seen that the fastener must be given a quarter-turn in order to bring the prongs to stand in a plane parallel with the reciprocatory slide 19 and to the fastener-seat in a corresponding position. If the fastener descended to the raceway in front of the slide 19 without having been given a quarter-turn, the prongs would stand in the plane at right angles to said raceway or slide and would therefore be in improper position for the fastener-seat.

What we claim as our invention is—

1. A button-setting machine comprising a hopper and a runway formed in sections, the upper section arranged to receive staples with the prongs projecting downward, and so shaped as to guide the staples to a position in which the prongs will project horizontally both in the same plane, means to suspend the staple by one of its prongs and permit the staples to swing downward by gravity to accomplish a partial axial rotation, whereby the prongs are caused to project horizontally in the same vertical plane, the lower section of the runway shaped to receive the fastener in said last-mentioned position and to guide it to a position in which the prongs project upward.

2. A button-setting machine comprising a hopper and a runway formed in sections, the upper section arranged to receive staples with the prongs projecting downward, and so shaped as to guide the staples to a position in which the prongs will project horizontally both in the same plane, means to suspend the staple by one of its prongs and permit the staples to swing downward by gravity to accomplish a partial axial rotation, whereby the prongs are caused to project horizontally in the same vertical plane, the lower section of the runway shaped to receive the fastener in said last-mentioned position and to guide it to a position in which the prongs project upward, and mechanism to feed the fastening to required position to engage the work.

3. In a button-setting machine, the combination with a hopper, of an upper channeled fastener-runway leading from the hopper, a lower fastener-runway to receive a fastener from the first-named runway and leading to a fastener-seat, the upper runway arranged to receive a two-pronged fastener from the hopper, the lower runway constituting a reversing-runway, an oscillatory dropper-blade at the base of the channeled runway at one side thereof, and an oscillatory supporting-blade on the opposite side of the channeled runway at the base thereof, and means to oscillate said blades, said dropper-blade and said supporting-blade projecting into the channel of the runway.

4. In a button-setting machine, the combination of a die-spindle, a lever to actuate the die-spindle, means to actuate the lever, a hopper, an upper fastener-runway arranged to carry a two-pronged fastening from the hopper, a lower runway to receive the fastener from the upper runway, an oscillatory dropper-blade, and an oscillatory supporting-blade at the base of the upper runway to suspend the fastener by one of the prongs, and to permit the suspended fastener to swing downward by gravity and thereby have a partial axial rotation to bring the two prongs into the same upright plane, said blades actuated in one direction by said lever.

5. The combination with a rotatable feeding device, of a runway, an oscillatory lever pivotally supported between its extremities adjacent to the throat of the runway to clear the runway, and a cam independent of the feeding device upon the shaft of the feeding device to operate said lever.

6. In a button-setting machine provided with a runway, a die-spindle, means to limit the upward movement of the die-spindle, a lever to actuate the die-spindle having an independent upward movement after the spindle has reached the limit of its upward stroke, a button-holding device, mechanism to feed forward a button from the runway upon the upward movement of the die-spindle and to give to the button a further forward movement upon the further independent movement of said lever.

7. In a button-setting machine provided with a runway, a reciprocatory die-spindle, means to limit the upward movement of the die-spindle, a lever to actuate the die-spindle having an independent upward movement after the spindle has reached the limit of its upward stroke, a button-holding device, a reciprocatory slide at the base of the runway to deliver a button to the button-holding device, a means actuated by the descent of the spindle to retract said slide, and means to advance said slide when the die-spindle is lifted, and to give to the slide a further forward movement upon the independent upward movement of said lever.

8. In a button-setting machine, the combination of a supporting-frame, a shaft, a cam upon the shaft, a die-spindle, means to limit the upward movement of the die-spindle, a lever operated by the cam to operate the die-spindle, said lever having a limited independent upward movement after the spindle has reached the limit of its upward stroke without actuating the spindle, a button-feeding mechanism actuated in one direction by the independent movement of the lever to feed a button to the then stationary die-spindle, and means to actuate the button-feeding mechanism in the opposite direction.

9. In a button-setting machine, the combination of a supporting-frame, a shaft, a cam upon the shaft, a die-spindle, means to limit the upward movement of the die-spindle, a lever operated by said cam to actuate the spindle and having a limited independent upward movement after the spindle has reached the limit of its upward stroke, a button-runway, a button-holding device, mechanism to deliver a button from the runway to the button-holding device, said mechanism comprising a feeding-lever, and means to hold one end of said lever against the outer end of the lever actuating the spindle.

10. The combination with staple-setting mechanism provided with a reciprocatory die-spindle and its die, of a button-holding device consisting of arms secured to the die-spindle and reciprocatory therewith, one of said arms constructed to engage the head of a button, the other arm constructed to form a seat for the eye of a button, and means to adjust the position of said latter arm toward or from the die-spindle.

11. The combination with staple-setting mechanism provided with a case, and a die-spindle reciprocatory in said case, of a spring-arm secured to the die-spindle and reciprocatory therewith constructed to engage the head of a button and to hold the button in position to receive the prongs of a fastening, the lower end of said spring-arm impinging against said case in the upward movement of the spindle to force the arm upon the button.

12. In a fastener-setting machine, the combination with a reciprocatory die, a button-holding device adjacent to the die, a seat for a fastener beneath the reciprocatory die, a fastener-hopper, a runway to carry a two-pronged fastener from the fastener-hopper with the prongs projecting downward so shaped as to guide the staples to a position in which the prongs will project horizontally both in the same plane, means to suspend the fastener by one of its prongs and permit the suspended fastener to swing downward by gravity and thereby have a partial axial rotation, means to further arrange the prongs of the fastening in desired relation to the machine and to the work, means to deliver the fastener to the die-seat with the prongs projecting upward, and means to feed a button to the button-holding device above the fastening, whereby the prongs of the fastening may be engaged through the work from beneath and through the attaching portion of the button thereabove and clenched over said attaching portion of the button and upon the surface of the goods.

13. In a fastener-setting mechanism, the combination with a seat for a fastener, of a fastener-hopper, a fastener-guideway adjacent to the seat, a fastener-runway arranged to receive a two-pronged fastener from the hopper with the prongs projecting downward, so shaped as to guide the staples to a position in which the prongs will project horizontally both in the same plane, means to suspend the fastener by one of its prongs and permit the suspended fastener to swing downward by gravity and thereby have a partial axial rotation, means to feed the fasteners one by one from the runway to said seat with their prongs projecting upward, said guideway provided with a covering adjacent to the fastener-seat to protect the prongs of a fastening from the goods.

14. In a fastener-setting mechanism, the combination with a fastener-runway, of a spring to engage the head of a fastener, a dropper-blade projecting below said spring to engage a prong of a fastener, and means to oscillate said blade, said spring movable with the blade to release the head of the fastening when the blade oscillates in one direction, and retracted into normal position when the blade is oscillated in the opposite direction.

15. In a fastener-setting mechanism, the combination with a runway, of a spring to engage the head of a fastener, a fastener-dropper blade provided with a ledge at its lower end below said spring to engage the prong of a fastener, means to oscillate said blade to release said prong, said spring provided with a ledge at its lower end adjacent to said blade to engage the head of a fastener, said blade and spring simultaneously movable in like directions.

In testimony whereof we sign this specification in the presence of two witnesses.

ROBERT McKAY.
FRANK R. WELTON.

Witnesses:
N. S. WRIGHT,
M. HICKEY.